(12) United States Patent
Rice

(10) Patent No.: US 8,202,056 B2
(45) Date of Patent: Jun. 19, 2012

(54) MORPHABLE COMPOSITE STRUCTURE

(75) Inventor: Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 913 days.

(21) Appl. No.: 12/252,392

(22) Filed: Oct. 16, 2008

(65) Prior Publication Data

US 2010/0095684 A1    Apr. 22, 2010

(51) Int. Cl.
  *F01D 5/14*    (2006.01)
(52) U.S. Cl. ............................. 416/229 A; 416/241 R
(58) Field of Classification Search .............. 416/241 R, 416/241 A, 241 B, 240, 229 R, 230, 229 A, 416/DIG. 5, 23, 24, 3
  See application file for complete search history.

(56) References Cited

U.S. PATENT DOCUMENTS

| | | | |
|---|---|---|---|
| 591,822 A | 10/1897 | Curtis | |
| 3,509,942 A | 5/1970 | Lindberg | |
| 3,893,639 A | * 7/1975 | Croswell, Jr. | ................. 244/219 |
| 3,979,949 A | 9/1976 | Smith | |
| 4,484,132 A | 11/1984 | Crites | |
| 4,503,710 A | 3/1985 | Oertle et al. | |
| 4,591,511 A | 5/1986 | Peebles, Jr. | |
| 4,641,539 A | 2/1987 | Vilimek | |
| 4,759,812 A | 7/1988 | Miller | |
| 5,065,630 A | 11/1991 | Hadcock et al. | |
| 5,131,812 A | 7/1992 | Boyd et al. | |
| 5,518,565 A | 5/1996 | Castellucci et al. | |
| 5,614,305 A | 3/1997 | Paine et al. | |
| 5,638,165 A | 6/1997 | Duke et al. | |
| 5,650,570 A | 7/1997 | Goto et al. | |
| 5,698,977 A | 12/1997 | Simpson et al. | |
| 5,705,006 A | 1/1998 | Roudebush et al. | |
| 5,958,166 A | 9/1999 | Walters et al. | |
| 6,206,067 B1 | 3/2001 | Kociemba et al. | |
| 6,355,203 B1 | 3/2002 | Charmes et al. | |
| 6,419,187 B1 | 7/2002 | Buter et al. | |
| 6,468,372 B2 | 10/2002 | Kociemba et al. | |
| 6,656,299 B1 | 12/2003 | Grosskrueger et al. | |
| 6,759,352 B2 | 7/2004 | Delanoy et al. | |

(Continued)

FOREIGN PATENT DOCUMENTS

EP    1775445 A2    4/2007

(Continued)

OTHER PUBLICATIONS

Lazzaretto et al., Analytical and Neural Network Models for Gas Turbine Design and Off-Design Simulation, Int. J. Applied Thermodynamics, vol. 4, (No. 4), pp. 173-182, Dec. 2001.

(Continued)

*Primary Examiner* — Edward Look
*Assistant Examiner* — Adam W Brown
(74) *Attorney, Agent, or Firm* — Krieg DeVault LLP

(57) ABSTRACT

A morphable composite structure includes at least first and second layers fixed relative to one another. Each of the first and second layers includes structural fibers oriented substantially parallel to one another and a quantity of binder substantially fixing the structural fibers together. The fibers of the first layer are oriented asymmetrically to the fibers of the second layer. The morphable composite structure also includes at least one pattern of electrically-conductive particles connected with the first layer and spaced from the second layer. A current can be directed through the pattern to heat the fibers of the first layer and change the shape of the morphable composite structure.

24 Claims, 6 Drawing Sheets

U.S. PATENT DOCUMENTS

| | | | |
|---|---|---|---|
| 6,913,440 | B2 | 7/2005 | Ciacci et al. |
| 6,979,709 | B2 * | 12/2005 | Smalley et al. ............... 524/495 |
| 7,141,990 | B2 | 11/2006 | Bast et al. |
| 7,167,009 | B2 | 1/2007 | van Schoor et al. |
| 7,216,428 | B2 | 5/2007 | Memmen et al. |
| 7,225,681 | B2 | 6/2007 | Stillman et al. |
| 7,278,830 | B2 | 10/2007 | Vetters |
| 7,310,949 | B2 | 12/2007 | Carper |
| 7,384,240 | B2 | 6/2008 | McMillan et al. |
| 7,398,698 | B2 | 7/2008 | Griess et al. |
| 2002/0180077 | A1 | 12/2002 | Glatkowski et al. |
| 2003/0008125 | A1 | 1/2003 | Delanoy et al. |
| 2003/0088980 | A1 | 5/2003 | Arnold |
| 2006/0140772 | A1 * | 6/2006 | McMillan et al. ......... 416/241 R |
| 2007/0079507 | A1 | 4/2007 | Cheng et al. |
| 2007/0220748 | A1 | 9/2007 | Dasilva et al. |

FOREIGN PATENT DOCUMENTS

| | | |
|---|---|---|
| GB | 1328167 | 8/1973 |
| GB | 2258732 A | 2/1993 |
| GB | 2430472 A | 3/2007 |
| JP | 2001082102 A | 3/2001 |
| WO | 2006046974 A2 | 5/2006 |
| WO | 2007015709 | 2/2007 |

OTHER PUBLICATIONS

Statutory Invention Registration, US H2057H, Jan. 7, 2003, Veers et al., Load Attenuating Passively Adaptive Wind Turbine Blade.

Ni, Qing-Qing; Shape memory effect and mechanical properties of carbon nanotube/shape memory polymer nanocomposites; Composite Structures, Elsevier Science Ltd, GB, vol. 81, No. 2, Jun. 22, 2007, pp. 176-184, XP022131011, ISSN: 0263-8223 p. 176-177.

EP Extended Search Report for EP09252426.3.

Thostenson et al.; Multifunctional Composites with Self-Sensing Capabilities: Carbon Nanotube-Based Networks; SPIE, PO BOX 10 Bellingham WA 98227-0010, USA, 2007, XP040238630.

Yoshitake, et al.; Damage Evaluation for Composite Structures using Fiber Reinforced Composites as Self-Diagnosis Materials; SPIE, PO BOX 10 Bellingham WA 98227-0010, USA, 2004, XP040183195.

"Inexpensive Nanoglue Can Bond Nearly Anything Together;" Rensselaer Polytechnic Institute; Found at http://soenews.rpi.edu/update.do?artcenterkey=592. Applicant notes that the webpage alleges a posting date of May 17, 2007, however this date is not substantiated by the Internet archive, http://web.archive.org/web/*/http://soenews.rpi.edu/update.do?artcenterkey=592.

Baker, Dr. A.A.; Repair Techniques for Composite Structures; (Jan. 1, 1990), Composite Materials in Aircraft Structures, Longman, New York, pp. 207-227, XP008103764, ISBN: 9780582017122.

Examination Report for EP 09252426.3, European Patent Office, Oct. 26, 2010.

Examination Report for EP 09252426.3, European Patent Office, Jul. 17, 2011.

* cited by examiner

MORPHABLE COMPOSITE STRUCTURE

BACKGROUND OF THE INVENTION

1. Field of the Invention

The invention relates to composite structures formed with multiple layers, wherein each layer includes structural fibers at least partially embedded in a binder or matrix material.

2. Description of Related Prior Art

U.S. Pat. No. 7,384,240 discloses a composite blade for a turbine engine. The blade is formed from a plurality of layers bonded together. Each layer includes a plurality of reinforcing fibers in a matrix material. At various locations, the reinforcing fibers are oriented asymmetrically from one another. In operation, the asymmetrical orientation of the reinforcing fibers can lead to the blade changing shape.

SUMMARY OF THE INVENTION

In summary, the invention is a morphable composite structure. The morphable composite structure includes at least first and second layers fixed relative to one another. Each of the first and second layers includes a plurality of structural fibers oriented substantially parallel to one another and a quantity of binder substantially fixing the plurality of structural fibers together. The plurality of fibers of the first layer is oriented asymmetrically to the plurality of fibers of the second layer. The morphable composite structure also includes at least one pattern of electrically-conductive particles connected with the first layer and spaced from the second layer. A current can be directed through the pattern to heat the plurality of fibers of the first layer and change the shape of the morphable composite structure.

BRIEF DESCRIPTION OF THE DRAWINGS

Advantages of the present invention will be readily appreciated as the invention becomes better understood in view of the following detailed description of an exemplary embodiment of the invention, when considered in connection with the accompanying drawings wherein.

DETAILED DESCRIPTION OF THE EXEMPLARY EMBODIMENT

Figure 1:
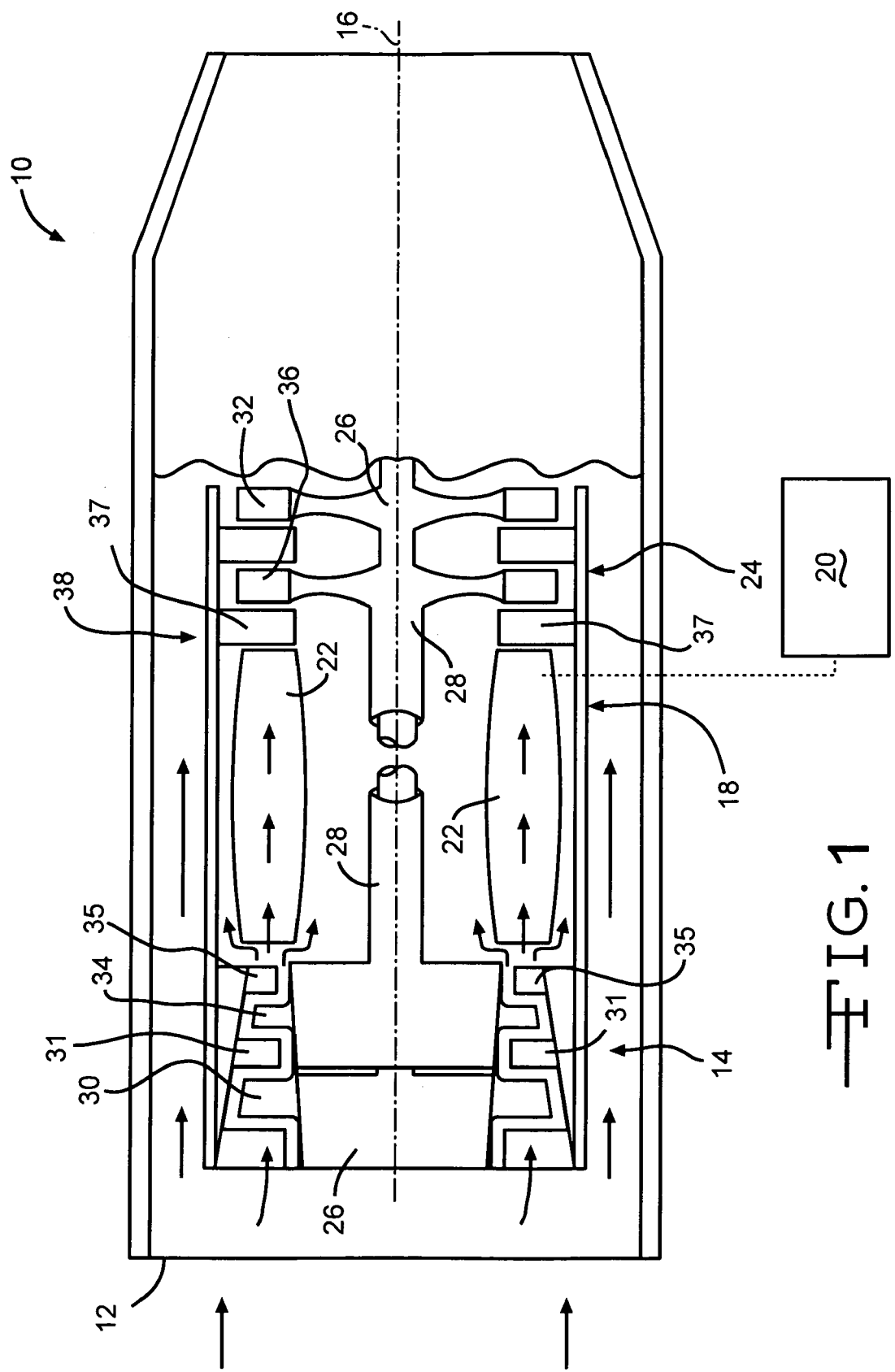
FIG. 1 is a schematic of a turbine engine which incorporates an exemplary embodiment of the invention.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which a hollow body is desired or required.

The exemplary turbine engine 10 can include an inlet 12 to receive fluid such as air. The turbine engine 10 may include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. A plurality of vanes 31 can be positioned to direct fluid downstream of the blades 30. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. A plurality of vanes 35 can be positioned to receive fluid from the blades 34. The shaft 28 can also support high pressure turbine blades 36 of a high pressure portion of the turbine section 24. A plurality of vanes 37 can be positioned to direct combustion gases over the blades 36.

The compressor section 14 can define a multi-stage compressor, as shown schematically in FIG. 1. A "stage" of the compressor section 14 can be defined as a pair of axially adjacent blades and vanes. For example, the vanes 31 and the blades 30 can define a first stage of the compressor section 14. The vanes 35 and the blades 34 can define a second stage of the compressor section 14. The invention can be practiced with a compressor having any number of stages.

A casing 38 can be positioned to surround at least some of the components of the turbine engine 10. The exemplary casing 38 can encircle the compressor section 14, the combustor section 18, and the turbine section 24. In alternative embodiments of the invention, the casing 38 may encircle less than all of the compressor section 14, the combustor section 18, and the turbine section 24.

The process of designing a turbine engine for any particular application can involve concurrently adjusting several parameters which may be of equal importance. For example, the design process can require balancing the maximum angular velocity of the shafts 26, 28, weight, outside diameter, and engine efficiency so that the final design lies within acceptable limits for each parameter. One aspect of the turbine engine's design that affects operation is the shape of static compressor vanes and rotatable compressor blades.

The compressor blades 30, 34 impart energy to the fluid flowing through the compressor section 14, resulting in an increase in fluid pressure. Subsequently, the fluid can pass through a downstream vane, where tangential or "swirl" velocity is removed and a rise in static pressure occurs. The vane 31 receives fluid from the blade 30 and the vane 35 receives fluid from the blade 34. The rise in pressure across any particular stage is proportional to the change in the tangential or whirl velocity across that stage.

Generally, the pressure ratio across any one particular stage of the compressor section 14 can be in the range of 1.3 to 1.4. The reason for the small pressure increase through each stage is that the rate of deceleration, or diffusion, of the fluid flow through each of the blades and vanes must be limited in order to avoid losses due to flow separation. Although the pressure ratio of each stage is relatively small, there is an overall increase in pressure across every stage. The ability to design multi-stage, axial compressors with controlled air velocities and attached flow minimizes losses and results in high efficiency and lower fuel consumption for a given power or thrust output. The shapes of the blade 30 and the vanes 31 play a role maintaining attached flow and therefore affect the efficiency of the turbine engine 10.

The shapes of the blades 30, 34 and the vanes 31, 35 also play a role in establishing the capacity of the turbine engine 10. Generally, under steady state operating conditions of the turbine engine 10, the compressor section 14 will operate along what is known in the art as a "working line." The working line is a line or curve on a graph that relates the overall pressure ratio to an inlet mass flow function (the overall pressure ratio defining the y-axis of the graph for reference). The graph is sometimes referred to as the "map" of the compressor. The overall pressure ratio is the ratio of the fluid pressure at the exit of the compressor section 14 over the fluid pressure at the inlet of the compressor section 14. The inlet mass flow function is the fluid flow mass rate at the inlet of the compressor section 14 multiplied by the square root of the fluid temperature at the inlet of the compressor section 14, wherein that sum is divided by the fluid pressure at the inlet of the compressor section 14.

Another feature of the map of the compressor is a "stability line." The stability line extends generally parallel to and above the working line on the graph. The stability line and the working line are developed based on testing, research, and experience with previously developed turbine engines.

At times during the operation of the turbine engine 10, the compressor section 14 may function above the working line. This can be referred to as "transient conditions" and can occur, for example, during acceleration of the turbine engine 10. It is desirable that the operation of the compressor section 14 be defined between the working line and the stability line during transient conditions, and not above the stability line. Generally, the limit of stable operation of the compressor section 14 (and therefore of the turbine engine 10 also) is governed by the stability line.

Each stage within the compressor section 14 can possess its own aerodynamic performance and handling characteristics. The stage characteristics of one stage are different from the stage characteristics of its neighboring stages. Accurate matching of the stages results in low losses and also a sufficient operating range for transient operation. The front stages of the compressor section 14 (such as the stage defined by blade 30 and vane 31) tend to control the low speed stability margin and the rear stages (such as the stage defined by blade 34 and vane 35) tend to control the high-speed stability margin. Well-designed shapes for the blades 30, 34 and for the vanes 31, 35 can enhance the operating range between the working line and the stability line by reducing the likelihood of losses.

The present invention can be embodied in a structure that can serve as an airfoil in the turbine engine 10, such as a blade or a vane. The present invention could also be practiced in other operating environments. The exemplary structure can change shape or morph during the operation of the turbine engine 10. By changing shape, the structure can change the operating properties of the turbine engine 10.

Figure 2:
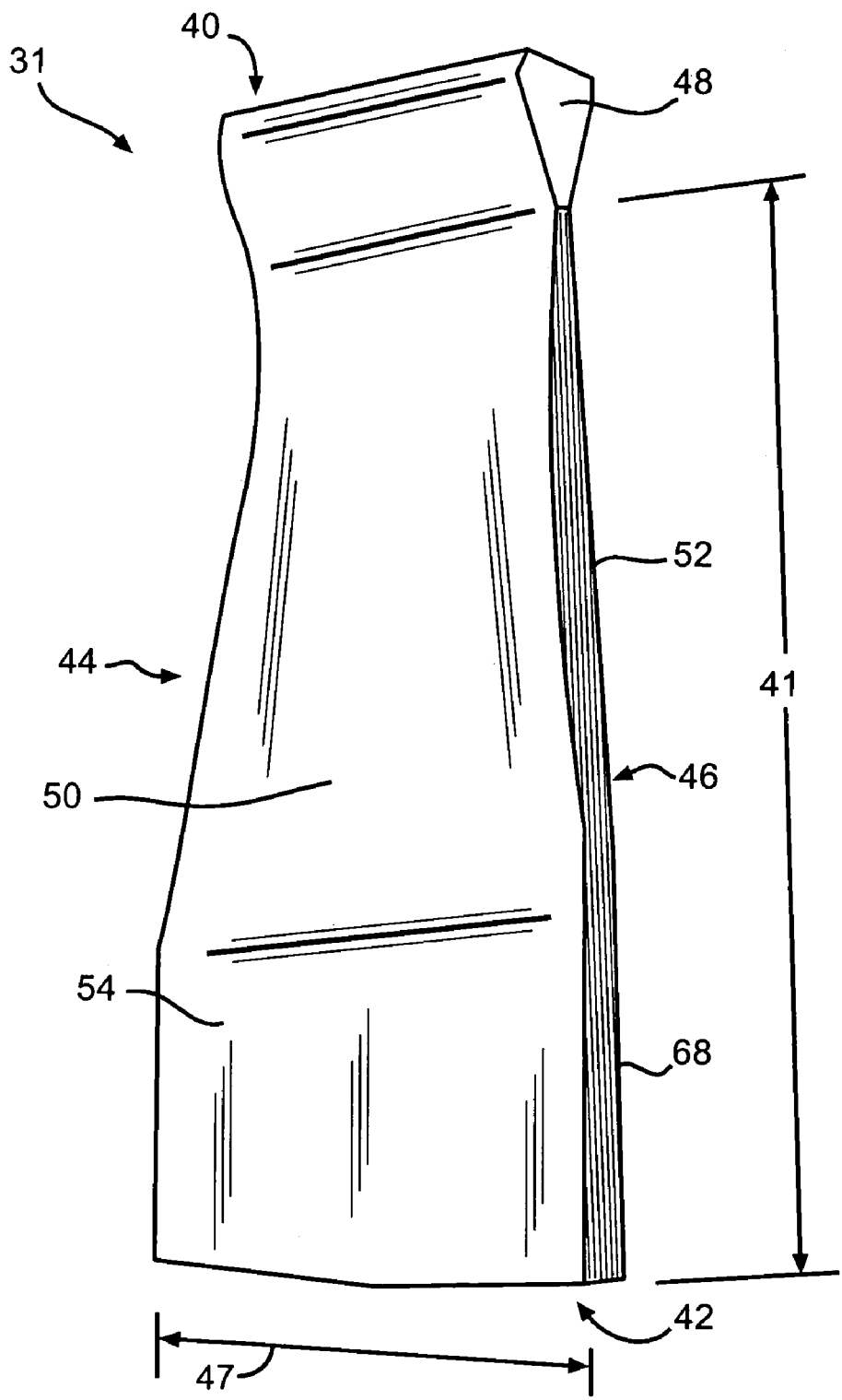
FIG. 2 is a perspective view of the exemplary embodiment of the invention.

FIG. 2 is a perspective of an embodiment of the invention formed as the compressor vane 31, which is also shown schematically in FIG. 1. The exemplary compressor vane 31 can include a root portion 40 and a fluid-guiding portion 41. The root portion 40 can include a dovetail 48 for mounting the vane 31 to the casing 38 (shown in FIG. 1) or some other structure. The fluid-guiding portion 41 can extend radially from the root portion 40 to a tip 42. When assembled to the turbine engine 10 (shown in FIG. 1), the tip 42 can be closer to the centerline axis 16 (shown in FIG. 1) than the root 40. The fluid-guiding portion 41 can extend axially from a leading edge 44 to a trailing edge 46, defining a cord 47. The exemplary compressor vane 31 can define a thickness between a front or suction surface 50 and a back or pressure surface 52.

Figure 3:
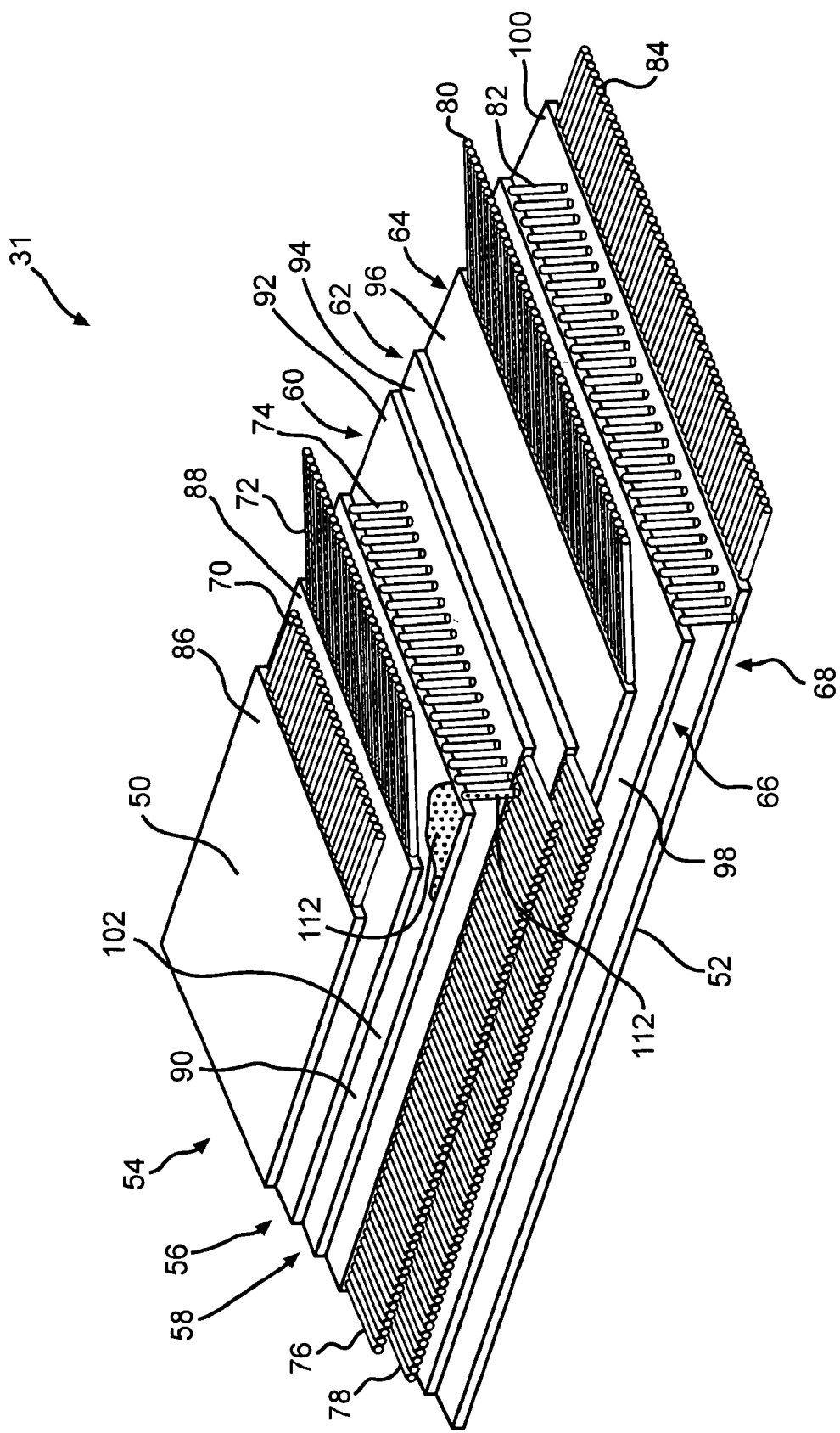
FIG. 3 is a perspective view of the exemplary embodiment of the invention with cut-away portions to reveal a laminate structure.

FIG. 3 shows a portion of the compressor vane 31 with portions cut-away to reveal a laminate or layered structure. Between the front and back surfaces 50, 52, the exemplary compressor vane 31 can include layers 54, 56, 58, 60, 62, 64, 66, 68 fixed together. The layers 54-68 can be fixed together with adhesive, for example. Each layer can be formed from a plurality of structural or reinforcing fibers and a binder or matrix substantially holding the structural fibers together. For example, the layers 54, 56, 58, 60, 62, 64, 66, 68 include fibers 70, 72, 74, 76, 78, 80, 82, 84 positioned in binder 86, 88, 90, 92, 94, 96, 98, 100, respectively. U.S. Pat. No. 7,384,240 is hereby incorporated by reference for teaching as to the kinds of fibers and binder material that can be used to form the exemplary embodiment of the invention or other embodiments of the invention.

The fibers 70-84 in any particular layer 54-68 can extend substantially parallel to one another. The groups of fibers 70-84 in the respective layers 54-68 can extend substantially or generally parallel to one another. The fibers 70 and 84 can be symmetrical to one another in that the fibers 70, 84 extend in substantially the same direction. The fibers 76 and 78 can also be symmetrical to one another. The fibers 72 and 82 can be asymmetrical to one another in that the fibers 72, 82 extend in different directions from one another. The fibers 74 and 80 can also be asymmetrical to one another.

Figure 4:
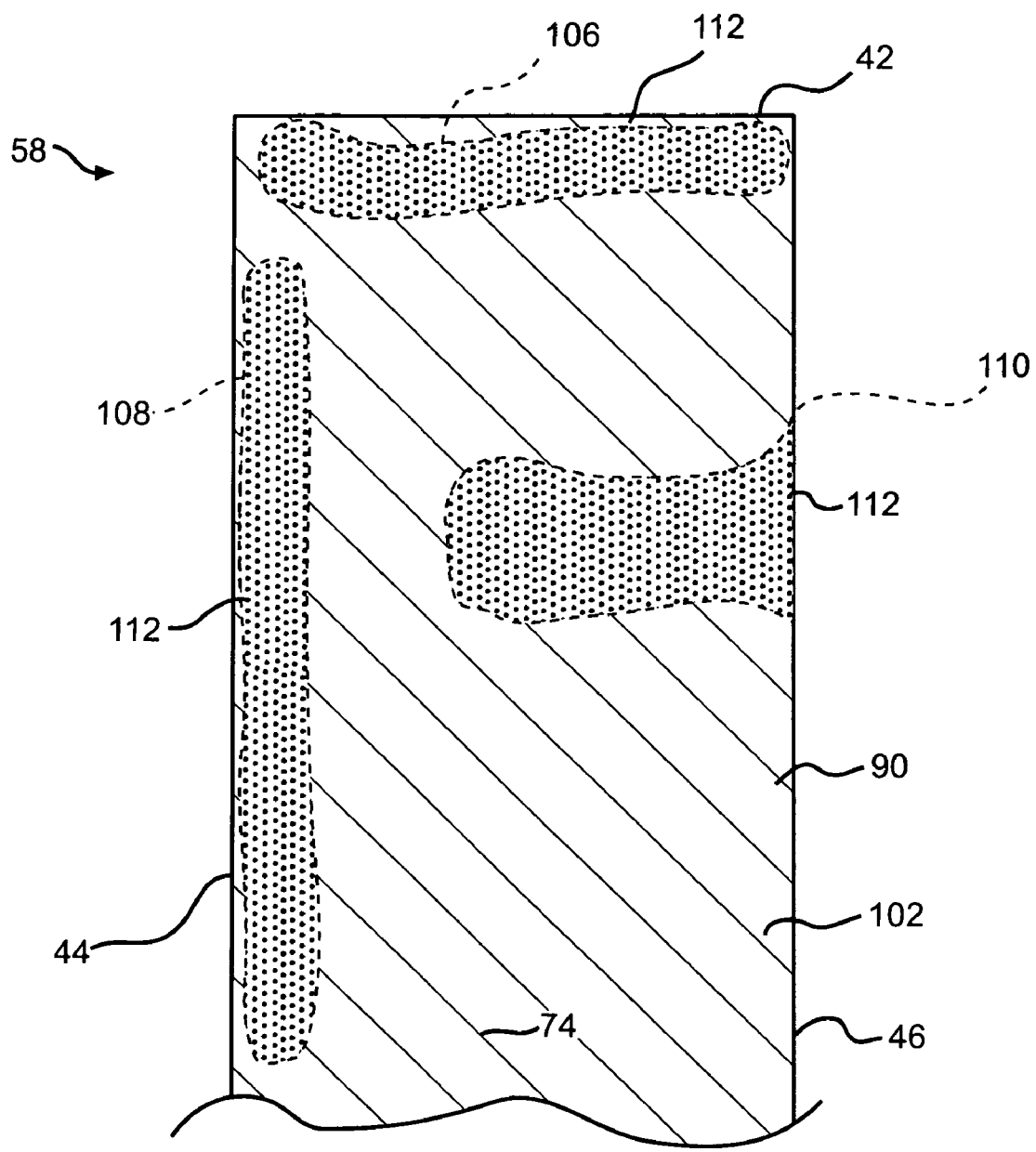
FIG. 4 is plan view of a first face of one of the layers of the laminate structure.
Figure 5:
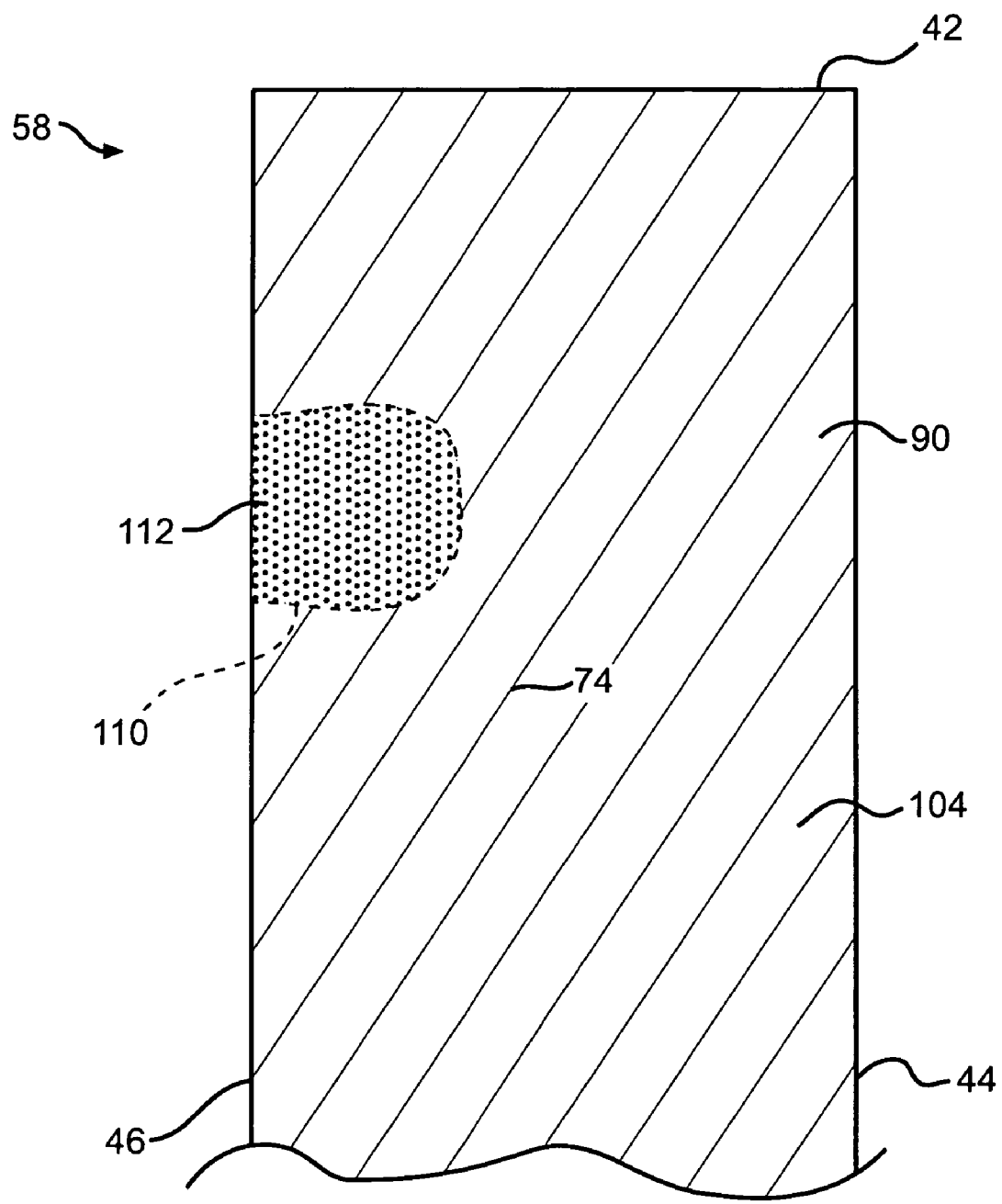
FIG. 5 is plan view of a second face of one of the layers of the laminate structure.

FIG. 4 shows a planar view of a first face 102 of the layer 58 and FIG. 5 shows a planar view of a second face 104 of the layer 58, opposite the first face 102. The first face 102 is also referenced in FIG. 3. The other layers 54, 56, and 60-68 (shown in FIG. 3) have been removed for FIGS. 4 and 5. The first face 102 is referenced in FIG. 3 to show the orientation of the faces 102, 104 relative to the other layers 54, 56, and 60-68. FIGS. 4 and 5 show the portion of the layer 58 corresponding to the fluid-guiding portion 41 of the exemplary compressor vane 31 (shown in FIG. 2).

Referring now particularly to FIG. 4, the exemplary compressor vane 31 can also include at least one pattern of electrically-conductive particles connected with the layer 58. The exemplary compressor vane 31 includes a plurality of patterns defined by the dashed lines referenced at 106, 108 and 110. The patterns 106, 108, 110 are positioned on the first face 102. Exemplary embodiments can be practiced with any number of patterns, patterns of any shape, and one or more patterns on any of the layers of the morphable composite structure. In some embodiments, one or more patterns may be positioned on only one face of a particular layer. In other embodiments, one or more patterns may be positioned on both faces of a particular layer. The patterns can follow the path of one or more of the structural fibers 74 or extend across multiple fibers 74. Patterns can be concentrated along an edge of a face, such as the pattern 106 is concentrated at the tip 42 and the pattern 108 concentrated at the leading edge 44. Alternatively, patterns can extend from an edge across the layer, such as pattern 110 extends from the trailing edge 46 to the center of the vane 31. As shown by FIGS. 4 and 5, a pattern can extend around an edge to at least partially cover both faces, such as pattern 110. The pattern can cover a majority of one or both of the faces 102, 104. A "majority" can be greater than 50%, such as 51%, 75%, 95%, 100% or any other percentage.

The at least one pattern, such as patterns 106 and 108, can be spaced from at least one of the other layers. As will be set forth more fully below, a current can be directed through the one or more patterns 108, 110 to heat the fibers 74 and induce a shape change in the vane 31 (shown in FIG. 2). It can be desirable to control the heating so that other layers are not heated or are minimally heated.

The electrically-conductive particles are referenced at 112 and can be any kind of particles capable of transmitting an electrical current. The electrically-conductive particles can be various materials in particle form, with the particles ranging in size. In the exemplary embodiment of the invention, nano-resistors such as carbon nanotubes can be the electrically conductive particles 112. In alternative embodiments of the invention, the electrically conducting particles can be carbon (graphite), silver, gold, copper, platinum or even finely particulate alloy materials. Embodiments of the invention can be practiced where the electrically-conductive particles 112 are a combination of different materials.

The electrically-conductive particles 112 can be connected with the layer 58 in any way desired. The electrically-conductive particles 112 can be at least partially embedded in the binder 90 of the layer 58, such as by being suspended in the binder 90 and/or by being associated with one of the structural fibers 74. The electrically-conductive particles 112 can be associated with one of the structural fibers 74 by being embedded in the fibers 74 or by being applied over an outer surface of the fibers 74 like a coating. The electrically-conductive particles 112 can also be applied on one or both of the faces 102, 104 like a coating.

The patterns 106, 108, 110 of electrically-conductive particles 112 define an active control mechanism for changing the shape of the exemplary compressor vane 31 (shown in FIG. 2). As set forth above, changing the shape of the exemplary compressor vane 31 can change the efficiency and operating characteristics of the turbine engine 10 (shown in FIG. 1). It is noted that, in practice, the control over the turbine engine 10 can be enhanced if all or a majority of the compressor vanes 31 (shown in FIG. 2) are controlled to change shape.

The shape of the exemplary compressor vane 31 can change when a current is directed through one of the patterns 106, 108, 110 of electrically-conductive particles 112. The current causes temperature of the layer 58 to increase relative to the other layers 54, 56 and 60-68 (shown in FIG. 3). The structural fibers 74 of the layer 58 elongate as temperature increases, causing the compressor vane 31 to bend or bow. Depending on the orientation of the fibers 74, the compressor vane 31 can bend in a radial direction or an axial direction.

Figures 6, 7:
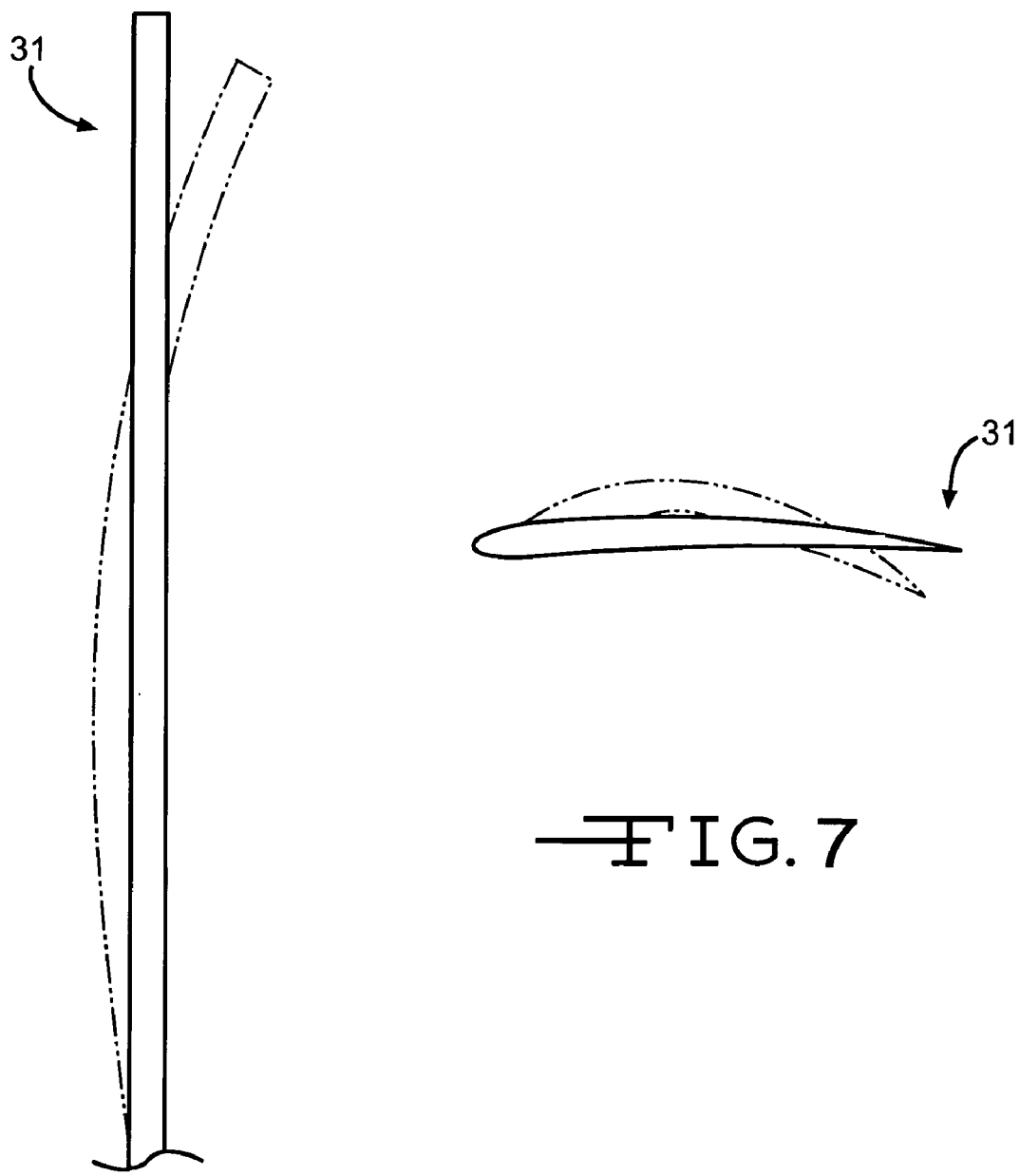
FIG. 6 is schematic view of an exemplary embodiment of the invention with a first shape in solid line and a morphed shaped in dash line, the morph or change in shape occurring along a radial direction.
FIG. 7 is schematic view of an exemplary embodiment of the invention changing shape span wise along the cord.

FIG. 6 schematically shows a side view of the compressor vane 31 in solid line prior to heating of the electrically-conductive particles 112 (shown in FIGS. 4 and 5). The compressor vane can be bent radially after heating of the electrically-conductive particles 112. The radially bent vane 31 is shown in phantom in FIG. 6. FIG. 7 schematically shows a top view of the compressor vane 31 in solid line prior to heating of the electrically-conductive particles 112. FIG. 7 also shows the compressor vane 31 bent axially after heating of the electrically-conductive particles 112. The axially bent vane 31 is shown in phantom in FIG. 7.

The patterns of electrically-conductive particles, such as the patterns 106, 108, 110 shown in FIG. 4, can be electrically isolated from one another so the shape of the morphable composite structure can be changed in different directions. For example, current can be directed through only the pattern 106 to achieve a first desired shape. Current can be directed through both of the patterns 106 and 108 to achieve a second desired shape different from the first desired shape. Similarly, current can be directed through only the pattern 108 to achieve a third desired shape different from the first and second desired shapes.

Embodiments of the invention can include multiple layers having one or more patterns of electrically-conductive particles. Referring again to FIG. 3, the layers 58 and 64 can include patterns that are mirror images of one another. Directing current through the one or more patterns of the layer 58 can result in a first desired shape and directing current through the one or more patterns of the layer 64 can result in a second desired shape that is a mirror image of the first desired shape. Another embodiment of the invention can include one or more patterns on layers 56, 58, 64 and 66. The patterns on layers 58 and 64 can be used to produce first and second desired shapes that are mirror images of another. The patterns on layers 56 and 66 can be used to produce third and fourth desired shapes that are mirror images of another and are different than the first and second desired shapes.

Embodiments of the invention can be practiced with measures to control the conduction of heat. The one or more patterns can be positioned on one face of a particular layer. For example, the one or more patterns can be positioned only on face 102 of the layer 58 to minimize the heat transfer to the layer 64. If the layers 58 and 64 were both heated, both sets of fibers 74 and 80 would lengthen and negate the bending effects. Also, one or more layers can be positioned between asymmetrical layers to reduce the flow of heat. For example, the layers 60, 62 can reduce the flow of heat between the layers 58 and 64.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Also, while this document may draw attention to certain features believed to be of particular importance, it should be understood that the Applicant claims protection in respect of any patentable feature or combination of features hereinbefore referred to and/or shown in the drawings whether or not particular emphasis has been placed thereon.

What is claimed is:

1. A morphable composite structure comprising:
   at least first and second layers fixed relative to one another, each of said first and second layers including a plurality of structural fibers oriented substantially parallel to one another and a quantity of binder substantially fixing said plurality of structural fibers together, wherein said plurality of fibers of said first layer is oriented asymmetrically to said plurality of fibers of said second layer; and
   wherein said first layer further includes at least one pattern of electrically-conductive particles in particulate form with an electrical current directed through said at least one pattern of electrically-conductive particles to heat said first layer relative to said second layer and provide differential thermal expansion between said first and second layers.

2. The morphable composite structure of claim 1 wherein said electrically-conductive particles are further defined as nano-resistors.

3. The morphable composite structure of claim 2 wherein said nano-resistors are further defined as carbon nanotubes.

4. The morphable composite structure of claim 1 wherein said first layer includes first and second opposite faces and wherein said at least one pattern is positioned only on said first face.

5. The morphable composite structure of claim 4 wherein said first face is directed away from said second layer.

6. The morphable composite structure of claim 1 wherein said first layer includes first and second opposite faces, one of said first and second faces directed toward said second layer, and wherein said at least one pattern is concentrated along an edge of at least one of said first and second faces.

7. The morphable composite structure of claim 6 wherein said at least one pattern is concentrated along an edge of both of said first and second faces.

8. The morphable composite structure of claim 1 wherein said first layer includes first and second opposite faces, one of said first and second faces directed toward said second layer, and wherein said at least one pattern covers a majority of at least one of said first and second faces.

9. The morphable composite structure of claim 8 wherein said at least one pattern covers a majority of both of said first and second faces.

10. The morphable composite structure of claim 1 wherein said at least one pattern includes first and second patterns of electrically-conductive particles that are electrically isolated from one another.

11. The morphable composite structure of claim 10 wherein said first and second patterns are both positioned on said first layer.

12. The morphable composite structure of claim 10 wherein said first pattern is positioned on said first layer and said second pattern is positioned on said second layer.

13. The morphable composite structure of claim 1 wherein said plurality of electrically-conductive particles is at least partially embedded in said binder of said first layer.

14. The morphable composite structure of claim 13 wherein said plurality of electrically-conductive particles is suspended in said binder.

15. The morphable composite structure of claim 13 wherein said plurality of electrically-conductive particles includes first and second quantities of particles, each of said first and second quantities associated with one of said plurality of structural fibers.

16. The morphable composite structure of claim 1 further comprising:
    a third layer disposed between said first and second layers, said third layer including a plurality of structural fibers oriented parallel to one another and a quantity of binder substantially fixing said plurality of structural fibers together, wherein said plurality of fibers of said third layer is oriented asymmetrical to said plurality of fibers of said first layer and to said plurality of fibers of said second layer.

17. The morphable composite structure of claim 16 further comprising:
    a fourth layer disposed on a side of said first layer opposite said third and second layers, said fourth layer including a plurality of structural fibers oriented parallel to one another and a quantity of binder substantially fixing said plurality of structural fibers together, wherein said plurality of fibers of said fourth layer is oriented asymmetrical to said plurality of fibers of said first layer and to said plurality of fibers of said second layer; and
    a fifth layer disposed on a side of said second layer opposite said first and third layers, said fifth layer including a plurality of structural fibers oriented parallel to one another and a quantity of binder substantially fixing said plurality of structural fibers together, wherein said plurality of fibers of said fifth layer is oriented asymmetrical to said plurality of fibers of said first layer and to said plurality of fibers of said second layer.

18. The morphable composite structure of claim 17 wherein said at least one pattern includes a plurality of patterns of electrically-conductive particles that are electrically isolated from one another, including:
    a first pattern associated with said first layer; and
    a second pattern associated with said second layer.

19. A composite airfoil comprising a root portion and a fluid-guiding portion, said fluid-guiding portion having a tip, a chord, a leading edge, a trailing edge, a suction surface extending from said leading edge to said trailing edge and a pressure surface extending from said leading edge to said trailing edge, said composite airfoil comprising at least first and second layers fixed relative to one another and each including reinforcing fibers in a matrix material, said fluid-guiding portion adjacent said tip having at least a region at said mid chord comprising an asymmetric arrangement of said reinforcing fibers of said first layer relative to said reinforcing fibers of said second layer, and wherein an active control mechanism is provided in said fluid-guiding portion, wherein said first layer further includes a pattern formed from electrically conductive particles in particulate form with an electrical current directed through said pattern of electrically conductive particles to heat said first layer relative to said second layer and provide differential thermal expansion between said first and second layers.

20. The morphable composite structure of claim 1 wherein a temperature of said first layer is greater than a temperature of said second layer to provide said differential thermal expansion between said first and second layers.

21. The morphable composite structure of claim 1 wherein said at least one pattern of electrically-conductive particles of said first layer is electrically isolated from said second layer.

22. The morphable composite structure of claim 1 wherein said electrically-conductive particles are further defined as nano-particles.

23. The morphable composite structure of claim 22 wherein said electrically-conductive particles are further defined as nano-resistors.

24. A turbine engine comprising:
a compressor section;
a combustor section operable to receive compressed fluid from said compressor section; and
a turbine section operable to receive combustion gases from said combustor section, wherein one of said compressor section and said turbine section includes at least one composite airfoil having a root portion and a fluid-guiding portion, said fluid-guiding portion having a tip, a chord, a leading edge, a trailing edge, a suction surface extending from said leading edge to said trailing edge and a pressure surface extending from said leading edge to said trailing edge, said composite airfoil comprising at least first and second layers fixed relative to one another and each including reinforcing fibers in a matrix material, said fluid-guiding portion adjacent said tip having at least a region at said mid chord comprising an asymmetric arrangement of said reinforcing fibers of said first layer relative to said reinforcing fibers of said second layer, and wherein an active control mechanism is provided in said fluid-guiding portion, said active control mechanism being a pattern formed from electrically conductive particles in particulate form with an electrical current directed through said pattern of electrically conductive particles to heat said first layer relative to said second layer and provide differential thermal expansion between said first and second layers.

* * * * *